(12) United States Patent
Matama (10) Patent No.: US 7,173,732 B2
(45) Date of Patent: Feb. 6, 2007

(54) IMAGE PROCESSING METHOD (75) Inventor: Toru Matama, Kanagawa (JP)

(73) Assignee: Fuji Photo Film Co., Ltd., Minami-ashigara (JP)

( * ) Notice: Subject to any disclaimer, the term of this patent is extended or adjusted under 35 U.S.C. 154(b) by 1024 days.

(21) Appl. No.: 10/109,690

(22) Filed: Apr. 1, 2002

(65) Prior Publication Data
US 2002/0140957 A1 Oct. 3, 2002

(30) Foreign Application Priority Data
Mar. 30, 2001 (JP) ............................. 2001-098955

(51) Int. Cl.
G06F 15/00 (2006.01)
(52) U.S. Cl. ................. 358/1.9; 358/1.2; 358/528; 358/532; 358/451; 358/3.27; 358/527; 382/298; 382/148; 382/263; 382/260; 382/264; 715/527
(58) Field of Classification Search ............... 358/1.9, 358/1.2, 528, 532, 451, 3.27, 527; 382/298, 382/148, 299, 263, 260, 264
See application file for complete search history.

(56) References Cited

U.S. PATENT DOCUMENTS 5,844,689 A * 12/1998 Kawase ..................... 358/296
5,937,232 A * 8/1999 Taguchi et al. ............... 399/81
5,995,201 A * 11/1999 Sakaguchi .................... 355/55
6,031,641 A * 2/2000 Hoshino ..................... 358/521
6,072,916 A * 6/2000 Suzuki ....................... 382/303
6,323,934 B1 * 11/2001 Enomoto ..................... 355/40
6,459,436 B1 * 10/2002 Kumada et al. ............. 345/590
6,798,921 B2 * 9/2004 Kinjo ......................... 382/282
2005/0278625 A1 * 12/2005 Wessling et al. ............ 715/527

FOREIGN PATENT DOCUMENTS

| EP | 0529403 A2 * | 3/1993 |
| JP | 10-013680 | 1/1998 |
| JP | 2000-112045 * | 4/2000 |

* cited by examiner

Primary Examiner—Kimberly Williams
Assistant Examiner—Beniyam Menberu
(74) Attorney, Agent, or Firm—Birch, Stewart, Kolasch & Birch, LLP (57) ABSTRACT An image processing method of subjecting image data having been supplied to image processing so as to arrange the image data as output image data has the steps of: performing a verification for adjusting image processing conditions when necessary referring to a finished-state anticipating image; and performing an image processing operation, which is not affected by the adjustment of the image processing conditions performed by the verification, is performed regardless of whether or not the verification has been finished.

5 Claims, 3 Drawing Sheets

IMAGE PROCESSING METHOD

BACKGROUND OF THE INVENTION

The present invention relates to image processing that is mainly used in a digital laboratory system, and more particularly to an image processing method capable of outputting images effectively by improving the throughput of the system.

Most of the images recorded on photographic films (which are hereinafter referred to as "films") such as negatives, reversals, and the like are conventionally printed onto light-sensitive materials (photographic papers) by a technique generally called "direct exposure" in which the image recorded on a film is projected onto the light-sensitive material for areal exposure (one spot exposure).

In contrast, recently, a printing apparatus which makes use of digital exposure, that is, a digital laboratory system has been commercialized. In this digital laboratory system, the image recorded on a film is read photoelectrically and converted into digital signals, which are subjected to various kinds of image processing to produce recording image data; and a light-sensitive material is exposed by scanning with recording light modulated in accordance with the image data to thereby record an image (latent image) on the light-sensitive material, and a (finished) print on which the image is recorded is reproduced.

The digital laboratory system having these features is composed of the following three basic components; a scanner (image reading apparatus) which applies reading light onto a film and reads the light projected therefrom to thereby photoelectronically read the image recorded on the film; an image processing apparatus which performs predetermined image processing to the image data read with the scanner to obtain image data, that is, exposure conditions for recording the image; a printer (image recording apparatus) which scan exposes a light-sensitive material with, for example, a light beam in accordance with the image data supplied from the image processing apparatus and records a latent image; and a processor (developing apparatus) which subjects the light-sensitive material having been exposed by the printer to development processing and creates a (finished) print on which the image is reproduced.

According to the digital laboratory system, a print of high quality that cannot be obtained by conventional direct exposure can be obtained because image processing can be appropriately performed by processing image data. Moreover, the digital laboratory system can output, as a print, not only the image recorded on a film but also an image recorded by a digital camera, and the like and an image (image data) obtained through the Internet, and so on. Further, since the digital laboratory system processes an image as digital image data, it can not only output the image as a photographic print but also output the image data to a recording medium such as a CD-R as an image file.

The digital laboratory system performs prescan for roughly reading an image recorded on a film, for example, the state of the image; and then performs fine scan for reading the image at a high resolution to output the image after image reading conditions, and the like are set using the image data obtained in the prescan (prescan data). Both image data is stored in predetermined memories. Further, image processing conditions for obtaining output image data are set by analyzing the resultant image data (image analysis).

In an ordinary print creation, a verification is performed to confirm an image, and to adjust an image (image processing conditions) when necessary in order to output a print on which an appropriate image is reproduced. The digital laboratory system performs the verification by creating a finished-state anticipating image (image to be verified), which has been subjected to image processing under set image processing conditions, by using prescan data or fine scan data, and displaying the finished-state anticipating image on a display unit. Further, when the image to be verified that is displayed on the display unit is not in an appropriately finished state, the color and the density of the image is adjusted, that is, the image processing conditions are adjusted.

When it is determined that the image is appropriate (the verification is acceptable), the operator instructs an output instruction for the image. With this operation, fine scan image data (fine scan data) is read out from the memory, an image processing operation is started to carry out image processing of the fine scan data depending on the determined image processing condition. After the image processing is finished, the image data is output to a printer as an output image data and further is stored into the recording medium such as the CD-R and the like as an image file.

That is, the conventional digital laboratory system starts the image processing operation of the fine scan data (image data to be output) after the verification is finished, a problem arises in that a processing efficiency is insufficient.

SUMMARY OF THE INVENTION

An object of the present invention is to provide an image processing method of effectively performing the image processing operation of output image data to thereby increase the throughput of an overall system so as to improve productivity by solving the problem of the conventional art in digital image processing in which a verification is performed using a finished-state anticipating image.

In order to attain the object, according to the present invention, an image processing method is provided, of subjecting image data having been supplied to image processing so as to arrange the image data as output image data, having the steps of: performing a verification for adjusting image processing conditions when necessary referring to a finished-state anticipating image; and performing an image processing operation, which is not affected by the adjustment of the image processing conditions performed by the verification, is performed regardless of whether or not the verification has been finished.

Preferably, the image processing operation, which is not affected by the adjustment of the image processing conditions performed by the verification, relates to at least one of image compression processing, enlargement/reduction processing, sharpness emphasis processing, and image density dynamic range compression processing.

Preferably, the image processing operation, which is not affected by the adjustment of the image processing conditions performed by the verification, is frequency separation processing in the compression of an image to JPEG 2000 format.

Preferably, the image processing operation, which is not affected by the adjustment of the image processing conditions performed by the verification, is sharpness emphasis processing and the creation of frequency components in the image density dynamic range compression processing.

Preferably, the image processing operation, which is not affected by the adjustment of the image processing conditions performed by the verification, is the creation of thumb nail images for index print.

Preferably, the finished-state anticipating image is created using image data corresponding to the output image data.

DETAILED DESCRIPTION OF THE INVENTION

An image processing method of the present invention will be described below in detail with reference to a preferable embodiment shown in the accompanying drawings.

Figure 1:
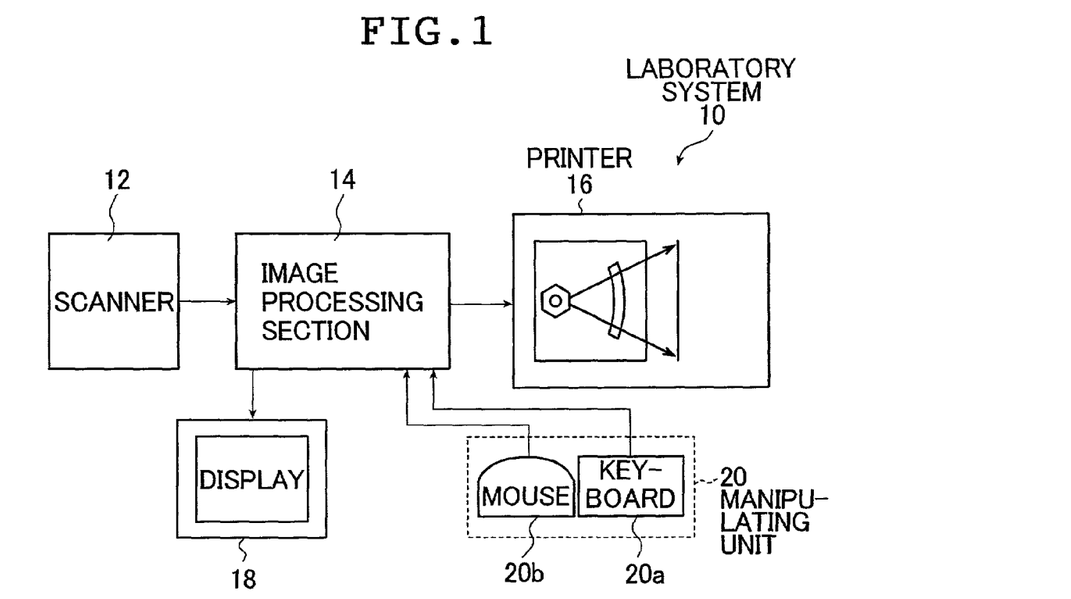
FIG. 1 is a block diagram of an embodiment of a (digital) laboratory system making use of an image processing method of the present invention.

FIG. 1 shows a block diagram of an example of a digital laboratory system making use of the image processing method of the present invention.

The digital laboratory system (hereinafter, referred to as "laboratory system") 10 as shown in FIG. 1 reads an image recorded on a film F photoelectrically and outputs the image as a print and is basically composed of a scanner 12, an image processing section 14, a printer 16, a display 18 connected to the image processing section 14, a manipulating unit 20 having a keyboard 20a and a mouse 20b. Further, the keyboard 20a includes various adjustment keys such as adjustment keys for the respective colors of C (cyan), M (magenta), and Y (yellow), a density adjustment key, a γ(gamma) (gradation) adjustment key, a dodging intensity adjustment key.

Figure 2:
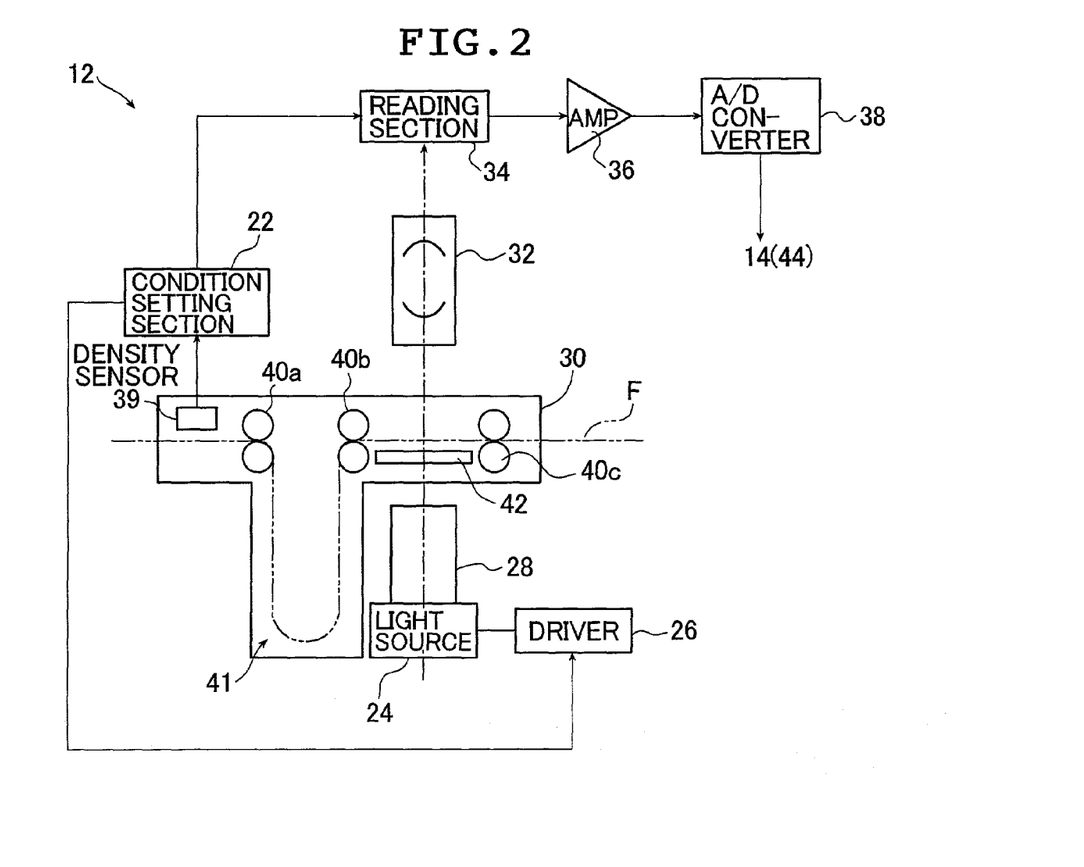
FIG. 2 is a conceptual view of a scanner of the laboratory system shown in FIG. 1.

The scanner 12 is an apparatus for photoelectrically reading the image recorded on the film F and is composed of a condition setting section 22, a light source 24, a driver 26, a diffusion box 28, a carrier 30, an imaging lens unit 32, a reading section 34, an amplifier 36, and an A/D (analog/digital) converter 38, as schematically shown in FIG. 2.

In the exemplified scanner 12, the light source 24 uses an LED (light emitting diode) and has three types of LEDs disposed therein that emit R (red) light, green (G) light, and B (blue) light, respectively. Note that an LED for emitting infrared light may be disposed in the light source 24 to detect foreign matters deposited on the film F, the flaws of the film F, and the like. The light source 24 arranged as described above is driven by the driver 26 and sequentially emits light having each of the respective colors when an image is read. The light emitted from the light source 24 is supplied to the diffusion box 28. The diffusion box 28 makes the light, which is incident on the film F, uniform in a film surface direction.

The carrier 30 intermittently transports the film F to sequentially transport and hold the respective images (frames) recorded on the film F to a predetermined reading position. A plurality of types of carriers are prepared in accordance with a film size, and the like as the carrier 30 and are arranged so as to be attachably and detachably mounted on the main body of the scanner 12.

In the exemplified example, the carrier 30 has a density sensor 39, a transport roller pairs 40 (40a, 40b, and 40c) and a mask 42 for regulating the reading region of each frame at the predetermined reading position. Further, the carrier 30 has a bar code such as a DX bar code, or the like, a bar code reader for reading the magnetic recording medium of an APS film, a magnetic head (for the APS film), and the like that are disposed therein.

The density sensor 39 measures the density of the image recorded on each frame of the film F before the film F is transported to the reading position. The result of measurement of the density measured with the density sensor 39 is supplied to the condition setting section 22. The condition setting section 22 detects the image density range of each from the result of measurement of the density performed by the density sensor 39 and determines reading conditions under which the output from the reading section 34 (CCD sensor) is saturated at a density that is somewhat lower than the minimum density of each frame. Concretely, the condition setting section 22 determines the drive current of the LEDs in the light source 24 and the accumulation time of the reading section 34 (CCD sensor), and issues an instruction to the driver 26 and the reading section 34.

The transport roller pairs 40 sequentially transport the film F shown by a two-dot-and-dash-line to the predetermined reading position frame by frame in a lengthwise direction and hold it at the position. The transport roller pairs 40b and 40c are disposed with the reading position (mask 42) interposed therebetween, and a loop forming section 41 is disposed between the transport roller pairs 40a and 40b to hold the film F in a dangling state. Further, the density sensor 39 is disposed upstream of the transport roller pair 40a in the transport direction thereof.

In the exemplified carrier 30, the density sensor 39 measures the density of the image of each frame while the film F is continuously transported by the transport roller pair 40a. The film F whose density of the images of the frames has been measured is accommodated in the loop forming section 41 once and then sequentially transported to the reading position frame by frame by the intermittent transportation of the film F from the loop forming section 41 performed by the transport roller pairs 40b and 40c.

The imaging lens unit 32 images the projecting light of the film F on the light receiving surface of the reading section 34.

The reading section 34, which photoelectrically reads the film F using an area CCD sensor, reads the entire surface of one frame of the film F regulated by the mask 42 of the carrier 30 (reading of an image by areal exposure or one shot exposure).

When the ordinary (for example, simultaneous print) film F is read in the scanner 12 arranged as described above, first, the film F is transported by the transport roller pairs 40 of the carrier 30. A first frame (or a final frame) is set at the reading position.

When the film F is transported, the density of the image of a frame having passed through the density sensor 39 is measured, and the reading conditions of the image of each frame is set by the condition setting section 22. Further, when the first frame is transported to the reading position, the transport roller pairs 40b and 40c stop. However, the transport roller pair 40a continuously transports the film F so that the density of the image of each frame is measured by the density sensor 39 as well as the reading conditions of the image of each frame is set by the condition setting section 22. The film whose density has been measured is accommodated in the loop forming section 41, as described above.

When the first frame is transported to the reading position, the driver 26 drives, for example, the red LED of the light source 24 in accordance with the reading conditions (drive current) set by the condition setting section 22, and the red LED emits red light. After the quantity of the red light is made uniform in parallel with the image plane of the film F by the diffusion box 28, the red light is incident on the reading position so as to be incident on the frame held thereat, passes therethrough, and acts as projecting light for carrying the image recorded on the frame.

The projecting light is imaged on the predetermined position (the light receiving surface of the area CCD) of the reading section 34 by the imaging lens unit 32, and the red image of the frame is photoelectrically read in accordance with the reading conditions (accumulation time) set by the condition setting section 22.

Likewise, the green and blue images of the frame are read by sequentially emitting the green and blue LEDs of the light source 24, whereby the reading of the frame is finished.

The output signals from the reading section 34 is amplified by the amplifier 36, and converted into a digital image signals by the A/D converter 38, and is supplied to the image processing section 14 (a data correcting section 44).

When the image of first frame has been completely read, the transport roller pairs 40b and 40c of the carrier 30 transport the film F so as to transport a frame to be read next to the reading position, and the image of the frame is read in the same way.

In the exemplified laboratory system 10, the scanner 12 basically reads all the images of one film continuously.

In an ordinary digital laboratory system, the scanner 12 reads the image recorded on one frame twice. That is, the scanner 12 carries out fine scan for reading the image at a high resolution to output a print, and the like and low scan that is performed at a low resolution prior to the fine scan to determine the reading conditions of the fine scan and image processing conditions.

In contrast, the exemplified laboratory system 10 determines the reading conditions for fine scan (reads an image for output) in accordance with the result of measurement of density performed by the density sensor 39 without performing prescan, and sets image processing conditions and creates an image to be verified using fine scan image data (fine scan data) by performing only the fine scan, as a preferable mode capable of obtaining the effect of the present invention with advantage.

Note that the image processing method of the present invention is by no means limited thereto and can be preferably used in a system in which the prescan is performed.

The image processing method of the present invention can obtain a preferable effect in a system for performing a sequence in which the image of each frame is fine scanned without depending upon the progress of a verification, in particular, in a system for performing a sequence, in which the fine scan data of the image of each frame has been obtained before the start of a verification, regardless of whether prescan is performed or not.

Further, in the digital laboratory system making use of the image processing method of the present invention, the scanner (image reading unit) is by no means limited to the one using the area sensor and may be a scanner for reading an image by so-called slit scan using a four-line CCD sensor for reading an infrared image, in addition to red, green and blue images.

Figure 3:
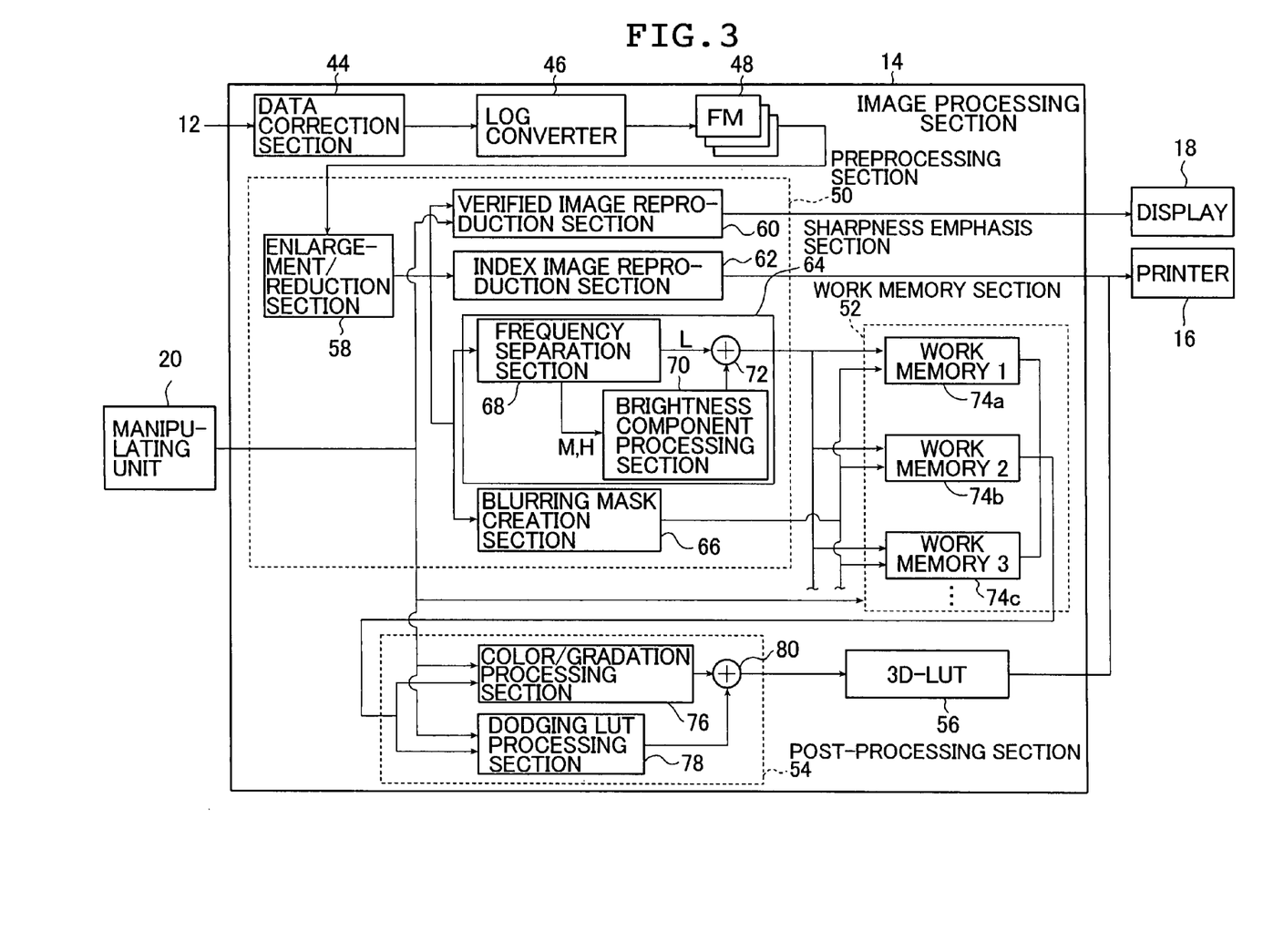
FIG. 3 is a block diagram of an image processing unit of the laboratory system shown in FIG. 1.

As described above, the digital image signals output from the scanner 12 is supplied to the image processing section 14. FIG. 3 shows a block diagram of the image processing section 14.

The image processing section 14 embodies the image processing method of the present invention. As shown in FIG. 3, the image processing section 14 includes a data correcting section 44, a Log converter 46, a frame memory (which is hereinafter called "FM") 48, a preprocessing section 50, a work memory section 52, a post-processing section 54, and a data converting section (3D-look-up table) 56. Note that the processing conditions at each of the sections are set in a setup section (not shown) using a know method of analyzing the image of image data (fine scan data).

The data correcting section 44 subjects the R, G, B image signals output from the scanner 12 to predetermined corrections such as DC offset correction, darkness correction, shading correction.

The Log converter 46 subjects the image signals having been processed in the data correcting section 44 to Log conversion through, for example, a look-up table and arranges the resultant image signals as digital image (density) data.

The R, G, B image data having been converted by Log converter 46 is stored in the frame memory 48.

As described above, in this laboratory system 10, the scanner 12 continuously reads the images of all the frames of one film F in principle. In correspondence to the above operation, the frame memory 48 has a capacity capable of storing the image data (fine scan data) of one film (for example, 40 frames that are the maximum number of frames of one film available at present).

The image data of the respective frames stored in the frame memory 48 is first subjected to image processing in the preprocessing section 50.

The preprocessing section 50 is a section, in which image processing operations that are not affected by image adjustment performed by a verification, is carried out. In the illustrated example, the preprocessing section 50 includes an enlargement/reduction section 58, a verified image creating section 60, an index image creating section 62, a sharpness emphasis section 64, and a dodging processing blurring mask creating section 66.

The enlargement/reduction section 58 subjects image data to enlargement/reduction processing (electronic magnification processing) using a known method such as an interpolating operation, a thinning-out operation to create the image data as image data having a size (number of pixels) corresponding to an output.

The verified image creating section 60 creates the verified image (finished-state anticipating image) of each frame using the image data having been processed in the enlargement/reduction section 58 and displays the verified image on the display unit 18. Concretely, the verified image creating section 60 subjects the image data, which has been processed in the enlargement/reduction section 58, to enlargement/reduction processing so that the image data has a size corresponding to a verified image, subjects the resultant image data to image processing under the image processing conditions having been set so that it is arranged as the verified image. Then, the verified image creating section 60 converts the verified image into image data, which can be displayed on the display unit 18 using a three-dimensional (3D)-look-up table, or the like, and the verified image is displayed on the display unit 18.

The number of verified images that are displayed on the display unit 18 at a time may be the verified image of one frame or the images of a plurality of frames such as six frames. Further, to improve a processing efficiency, (productivity of the laboratory system 10), the preprocessing section 50 places first priority on the processing performed in the verified image creating section 60 in the processing steps carried out in the enlargement/reduction section 58 and the subsequent sections.

The index image creating section 62 creates thumb nail images for index print from the image data of each of the frames having been processed in the enlargement/reduction section 58 by thinning-out, or the like, processes the resultant thumb nail images under the image processing conditions having been set, and stores them in a work memory.

Although not shown, the image processing section 14 has a post-processing section for an index. Similarly to the post-processing section 54, which will be described later, when the image of a certain frame has been completely verified, the post-processing section for the index reads out the thumb nail image of a corresponding frame from the work memory, subjects the thumb nail image to image processing and allocates it to the predetermined position of image data for an index print. When the images of all the frames of one film have been verified and image data for one sheet of index print is created, the index post-processing section supplies the image data to the printer 16.

The sharpness emphasis section 64 is a section for subjecting the image (image data), which has been processed in the enlargement/reduction section 58, to sharpness emphasis processing (sharpness processing) The sharpness emphasis section 64 has a frequency separating section 68, a luminance component processing section 70, and an adder 72.

The frequency separating section 68 extracts the low frequency component $S_L$ ($R_L$, $G_L$, $B_L$) of the image by processing the image data (original image data S) having been processed in the enlargement/reduction section 58 through a low-pass filter and extracts medium and high frequency components $S_{MH}$ ($R_{MH}$, $G_{MH}$, $B_{MH}$) by subtracting the low frequency component $S_L$ from the original image data S.

The luminance component processing section 70 extracts the luminance components $Y_{MH}$ of the medium and high frequency components $S_{MH}$ therefrom by an arithmetic operation using a matrix (for example, Y=0.3R+0.5G+0.11B) or the like, and then extracts a medium frequency luminance component $Y_M$ and a high frequency luminance component $Y_H$ from the luminance components $Y_{MH}$, such as similar to the frequency separating section 68. Thereafter, both the luminance components $Y_M$ and $Y_H$ are multiplied by a sharpness gain (sharpness emphasis coefficient), and the two components obtained by the multiplication are combined (added), whereby processed components $Y'_{MH}$ are created.

The sharpness gain is predetermined according to, for example, an enlargement/reduction ratio in the enlargement/reduction section 58, the size of a print to be created (size of an output image), or the like, and a larger sharpness gain more emphasizes sharpness. Further, a graininess suppression effect can be obtained by reducing the sharpness gain of the medium frequency component.

The adder 72 combines (adds) the low frequency component $S_L$ ($R_L$, $G_L$, $B_L$) extracted by the frequency separating section 68 and the processed components $Y'_{MH}$ created by the luminance component processing section 70. With this operation, the image (R, G, B image data) whose sharpness is emphasized is created.

The exemplified laboratory system 10 is a system which cannot adjust sharpness emphasis by a verification, that is, which cannot adjust a sharpness gain by a verification. However, the image processing method of the present invention is by no means limited thereto and may adjust the sharpness gain by a verification.

In this case, the preprocessing section 50 performs up to the step at which the intermediate and high frequency luminance components $Y_M$ and $Y_H$ are created, and the subsequent steps, at which the high and intermediate frequency luminance components $Y_H$ and $Y_M$ are multiplied by the sharpness gain, the processed components $Y'_{MH}$ are created by combining both the multiplied luminance components, and the low frequency component $S_L$ is combined with the processed components $Y'_{MH}$, are performed in the post-processing section 54 that will be described later. That is, in this case, the low frequency component $S_L$, the medium frequency luminance component $Y_M$, and the high frequency luminance component $Y_H$ are stored in a work memory 74 that will be described later.

Further, the illustrated example exemplifies the processing method of separating the frequency of an image to low, medium, and high frequency components and emphasizing sharpness by separating the frequency of an image and by creating the luminance component from the medium and high frequency components. However, the method of sharpness emphasis processing is by no means limited thereto in the present invention, and various methods can be used.

For example, a generally employed method, by which the frequency of an image is separated into a high frequency component and into low and medium frequency components using unsharp masking, and sharpness is emphasized by emphasizing the high frequency component, can be preferably used. In this method, the luminance component of the high frequency component may be or may not be always created. When the luminance component is not created, the unsharp masking processing is carried out independently as to red, green, and blue image data.

The blurring mask creating section 66 is a section in which a blurring mask used in dodging processing is created using the image data having been processed in the enlargement/reduction section 58. The dodging processing is image processing for providing a dodging effect, which is obtained when a print is created by a conventional direct exposure, for an output image by non-linearly compressing (or expanding) the dynamic range of an image density.

The blurring mask creating section 66 extracts luminance component data (bright/dark image of a present image) from the image data having been processed in the enlargement/reduction section 58, by, for example, a matrix operation similar to the above matrix operation, and then creates image data in which the bright/dark image is blurred (hereinafter, referred to as "blurring mask" by processing the luminance component data through a low-pass filter. Note that while the blurring mask of the luminance component data is created in the example, similar processing may be carried out by creating blurring masks in which an image is independently blurred by using red, green, and blue image data.

Note that when image compression is performed in the image processing section 14, it is preferable to perform the image compression, which is not affected by a verification, also in the preprocessing section 50.

For example, when image data is compressed to an image format of JPEG 2000 or the like, a frequency separating operation is performed first. However, it is preferable to perform this operation in the preprocessing section 50 because it is not related to color/gradation processing, and the like that is affected by a verification. While the frequency separation is similar to that in the above sharpness emphasis processing, the processing in JPEG 2000 has a feature in that filter characteristics are the characteristics of octave separation and that a wavelet transformation is used.

Specifically, image data is passed through the filter bank of JPEG 2000 in the preprocessing section 50, is subjected to frequency separation for octave separation, and is stored in the work memory 74, and color/gradation processing is performed only to a low frequency LL bank in the post-processing section 54 after a verification is finished.

The image data, which has been output from the adder 72 of the preprocessing section 50 and the sharpness of which has been emphasized (since this image data acts as main image data of an output, it is referred to as "image data" in the processing steps performed in the work memory section 52 and the subsequent sections) and the blurring mask, which has been output from the blurring mask creating section 66, are stored in the work memory section 52 once.

The work memory section 52 has a plurality of work memories 74 each composed of a frame memory, or the like (a first work memory 74$a$, a second work memory 74$b$, a third work memory 74$c$, . . . ,). The image data and the blurring masks of respective frames are supplied to the work memory section 52 and are appropriately divided and stored such that the image data and the blurring mask of one frame are stored in one work memory 74 (for example, the image data and the blurring mask of a first frame is stored in a first work memory 74$a$, the image data and the blurring mask of a second frame is stored in a second work memory 74$b$, . . . ,).

Note that when the image data is stored in the frame memory 48, the images of the respective frames are sequentially subjected to an image processing operation in the preprocessing section 50 and are sequentially stored in the work memories 74, regardless of the state of the progress of the verification, and the like, which will be described later in detail.

The post-processing section 54 performs the image processing operations that are affected by the image adjustment carried out by the verification. The post-processing section 54 has a color/gradation processing section 76, a dodging look-up table processing section 78, and an adder 80 in the illustrated example.

The image processing operation for each of the images of the frames in the post-processing section 54 is started after the verification is finished, which will be described later.

The color/gradation processing section 76 reads out the image data from the work memories 74 and subjects the image data to gradation conversion processing including color/density correction. For example, after color/gradation processing section 76 performs saturation correction (color correction) using a matrix operation, it carries out gradation conversion processing, which also acts as color balance adjustment and density correction processing, using a look-up table. When the film F is a negative film, negative image (density) data is converted into positive image (density) data corresponding to a visible image by the gradation conversion performed by the color/gradation processing section 76.

The matrix used in the matrix operation for performing the saturation correction and the look-up table for performing the gradation conversion are created by carrying out the know method using image analysis, as described above. Further, when adjustment inputs, and the like are entered through the color adjustment keys for the respective colors, the density adjustment key, and the γ adjustment key of the keyboard 20$a$ at the time the verification is carried out, the matrix and the look-up table are changed (adjusted) according to the adjustment inputs, and the like.

The dodging look-up table processing section 78 reads out the blurring mask from each work memory 74, processes the blurring mask through the dodging look-up table, and creates dodging data for performing dodging processing, that is, for compressing the dynamic range of the image density.

Figure 4:
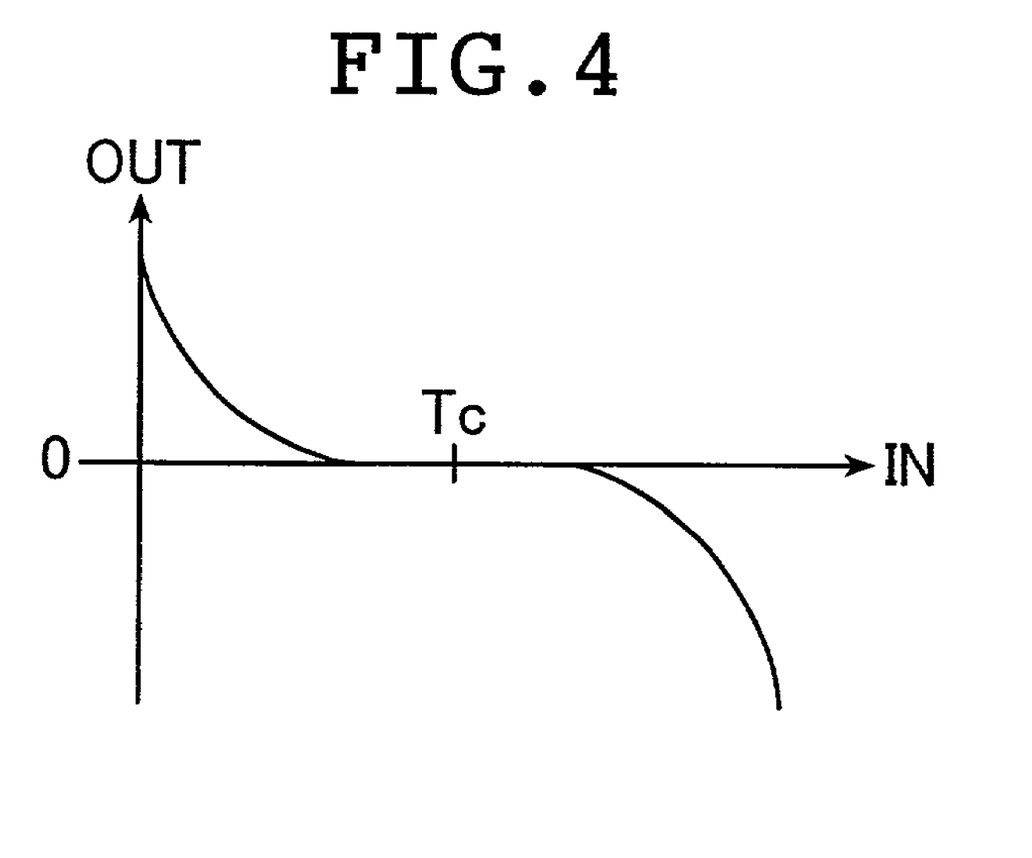
FIG. 4 is a graph showing an example of a dodging LUT in the image processing unit shown in FIG. 3.

The dodging look-up table is a look-up table shown in, for example, FIG. 4 (Tc shows an intermediate gradation of this system). Accordingly, when the blurring mask is processed with this look-up table, dodging data is output which is converted to a more negative side when it is larger data and is converted to a more positive side when it is smaller data.

This dodging look-up table is created by multiplying, for example, a basic look-up table (basic function) by a coefficient calculated by the image analysis. Further, when adjustment input, and the like are entered through the dodging intensity adjustment key of the keyboard 20$a$ at the time of verification, the dodging look-up table is changed (adjusted) accordingly.

The post-processing section 54 finally combines (adds) the image data, which has been processed in the color/gradation processing section 76, and the dodging data, which has been created in the dodging look-up table processing section 78, through the adder 80, and supplies the resultant data to the data converting section 56 as image data having been subjected to image processing.

As described above, the dodging data is image data that is converted such that larger original data is converted to a more negative side and a smaller original data is converted to a more positive side. Therefore, the combination of image data with the dodging image data result in a decrease in larger image data and in an increase in smaller image data, and thus the dynamic range of the image density is compressed, thereby a processing effect similar to that of the dodging performed in direct exposure can be obtained. Note that the dodging processing is described in detail in JP 10-13680 A, and so on filed by the applicant.

The illustrated laboratory system 10 is a system which can adjust the intensity of dodging processing by the verification, that is, a system which can change the dodging look-up table by the verification. However, the image processing method of the present invention is by no means limited thereto and may be a system which cannot change the dodging look-up table by the verification.

In this case, the dodging look-up table processing section 78 is disposed in the preprocessing section 50. The adder 80 is disposed downstream of the adder 72, the image data the sharpness of which has been emphasized is added to the dodging data in the preprocessing section 50, and the image data, which has been subjected to the dodging processing, is stored in the work memories 74 (that is, in this case, only the color/gradation processing section 76 is disposed in the post-processing section 54).

The data converting section (3D-look-up table) 56 converts the image data supplied from the post-processing section 54 using, for example, the 3D-look-up table so as to convert the image data to image data that can be printed by the printer 16 as a print (a photosensitive material is exposed thereby).

The printer 16 is a known color printer. A printer is exemplified for outputting a light-sensitive material such as photographic paper, or the like as a print after the light-sensitive material is two-dimensionally scan exposed with a light (laser) beam, which is modulated according to, for example, red, green, and blue image data supplied so as to record a latent image thereon, and after the thus exposed light-sensitive material is subjected to wet type development processing including development, fixing, and washing so that the latent image is converted to a visible image, and then is dried.

Note that, in the illustrated laboratory system 10, image data may be converted into, for example, an image file of a JPEG format, and the image file may be output to a recording medium such as a CD-R, and the like and to a communication network such as the Internet as an image file in place of that the image of the image data is output as a print.

The image processing method of the present invention will be described below in more detail by explaining the overall operation of the image processing section 14.

As described above, the scanner 12 does not perform prescan as well as continuously fine scans all the frames, on which images are recorded, of the film F in principle. The image signals of the respective frames, which have been read with the scanner 12, are sequentially supplied to the image processing section 14, are processed in the data correcting section 44, are subjected to Log conversion by the Log converter 46, and arranged as image data (fine scan data) that is stored in the frame memory 48. Further, when the image data is stored in the frame memory 48, image processing conditions are created by the image analysis and set in a predetermined section.

When the image data of a first frame is stored in the frame memory 48, it is read out in the preprocessing section 50. First, the image data is subjected to enlargement/reduction processing in the enlargement/reduction section 58 in accordance with an image size to be output, and then is supplied to the verified image creating section 60, to the index image creating section 62, to the sharpness emphasis section 64 (frequency separating section 68), and to the blurring mask creating section 66.

The verified image creating section 60 creates the verified image of the frame from the image data having been subjected to the enlargement/reduction processing, as described above, and displays the verified image on the display unit 18. Note that after the processing by the enlargement/reduction section 58 is finished, first priority is placed on the processing performed by the verified image creating section 60. Further, any of the verified image of one frame and the verified images of a plurality of frames may be displayed on one screen of the display unit 18, as described above.

Furthermore, the index image creating section 62 also create the thumb nail image of the frame from the image data having been subjected to the enlargement/reduction processing and stores it in the index print work memory.

As described above, in the sharpness emphasis section 64, the frequency separating section 68 extracts the low frequency component $S_L$ and the medium and high frequency components $S_{MH}$ from the image data (original image data S) having been subjected to the enlargement/reduction processing; the luminance component processing section 70 extracts the luminance component $Y_{MH}$, the medium frequency luminance component $Y_M$, and the high frequency luminance component $Y_H$ from the medium and high frequency components $S_{MH}$, multiplies both the luminance components by the sharpness gain, and creates the processed components $Y'_{MH}$; and the adder 72 combines the low frequency component $S_L$ with the processed components $Y'_{MH}$ to thereby create the image data of an image the sharpness of which is emphasized.

Further, the blurring mask creating section 66 subjects the image data, which has been subjected to the enlargement/reduction processing, to the matrix operation and to the low-pass filter processing, whereby a blurring mask (the image data of the blurring mask) is created.

The image data, which has been processed in the sharpness emphasis section 64, and the blurring mask, which has been created in the blurring mask creating section 66, are supplied to the work memory section 52 which stores them in, for example, the first work memory 74a.

When the image data of the first frame has been processed and the image data of a second frame is stored in the frame memory 48, the preprocessing section 50 reads out the image data of the second frame. Then, the preprocessing section 50 creates the verified image of the second frame, displays the verified image on the display unit 18 (prepares the display thereof when the verified image of one frame is displayed); creates a thumb nail image, outputs the image data having been processed in the sharpness emphasis section 64, and creates a blurring mask in the same way. Further, the work memory section 52 stores the image data having been output and the blurring mask in, for example, the second work memory 74b in the same way.

Likewise, when the image data of a third frame is stored in the frame memory 48 at the time the image data of the second frame has been completely processed, the image data of the third frame is processed, a verified image is displayed, a thumb nail image is created, the image data and a blurring mask are stored in, for example, the third work memory 74c, and further a fourth frame, a fifth frame, . . . , are sequentially processed in the same way. That is, when the image data of frames that are to be processed next is stored in the frame memory 48, the preprocessing section 50 processes the image data sequentially, and the work memory section 52 sequentially stores the image data of the respective frames having been output and blurring masks in the respective work memories 74.

In contrast, when the verified image of the first frame is displayed on the display unit 18 by the verified image creating section 60, the operator verifies the verified image. In the verification, the verified image is adjusted, when necessary, using the respective C (cyan), M (magenta), and Y (yellow) adjustment keys, the γ adjustment key, the dodging intensity adjustment key, and the like of the keyboard 20a.

Signals for adjusting the image are supplied to the verified image creating section 60, the color/gradation processing section 76 and the dodging look-up table processing section 78 of the post-processing section 54, and the like. Thus, the image processing conditions in the verified image creating section 60, the saturation correction matrix and the gradation conversion look-up table in the color/gradation processing section 76, and the dodging look-up table in the dodging look-up table processing section 78 are changed according to the image adjustment signals.

When the operator determines that the verified image is appropriate (the verification is acceptable), the operator issues an output command using the manipulating unit 20. At this time, when the verified image of the second frame is displayed, the operator verifies the verified image and issues an output command when the verification is acceptable, in the same way. Thereafter, the operator sequentially verifies the verified images of the subsequent frames, that is, the verified images of the third frame, the fourth frame, and so on.

The output command issued in accordance with the acceptance of the verification is supplied to the work memory section 52 and the post-processing section 54.

When the output command for the first frame is issued, image processing conditions are fixed according to the command, the work memory section 52 outputs the image data and blurring mask of the first frame from the first work memory 74a. Further, in the post-processing section 54, the color/gradation processing section 76 processes the image data using the matrix and the look-up table, as described above, and the dodging look-up table processing section 78 creates dodging data by processing the blurring mask with the dodging look-up table.

The image data, which has been processed in the color/gradation processing section 76, is combined with the dodging data, which has been created in the dodging look-up table processing section 78, by the adder 80, is arranged as image data having been subjected to image processing, and is supplied from the post-processing section 54 to the data converting section 56. The data converting section 56 converts the image data to image data, which can be printed by the printer 16, by the 3D-look-up table, and the resultant image data is supplied to the printer 16.

When a command for outputting the image of the second frame is issued after the image of the first frame has been processed, the work memory section 52 supplies the image data and the blurring mask of the second frame from the second work memory 74*b*. Then, the post-processing section 54 processes the image data and the blurring mask in the same way and supplies them to the data converting section 56. Thereafter, the image of the third frame, the image of the fourth frame, . . . , are sequentially processed in the same way.

As described above, in the conventional image processing, the image processing operation of fine scan data (output image data) is started after a verification has been finished.

In contrast, in the image processing section 14 making use of the image processing method of the present invention, the image processing operation, which is not affected by the verification, is beforehand performed as long as the fine scan data is obtained regardless of the progress of the verification, and the image processing operation, which is affected by the verification, is performed after the verification has been finished, as is apparent from the above description.

Therefore, according to the present invention, an image processing efficiency is improved and the throughput of the digital laboratory system is increased, thereby the productivity of the output of a print and an image file can be improved.

Note that the thumb nail images (image data) of the respective frames created in the index image creating section 62 are supplied to the index print work memory, processed in the index image post-processing section and divided, and then the image data is supplied to the printer 16 after image data for a sheet of index print has been created, as described above.

While the image processing method of the present invention has been described above in detail, the present invention is by no means limited to the above embodiment and it goes without saying that various improvements and modifications can be made within the range which does not depart from the gist of the present invention.

As described above in detail, according to the image processing method of the present invention, throughput can be increased by improving an image processing efficiency, whereby the productivity of the print and the image file can be improved.

What is claimed is:

1. An image processing method of subjecting image data having been supplied to image processing so as to arrange the image data as output image data, comprising the steps of:

performing a verification for adjusting image processing conditions when necessary referring to a finished-state anticipating image; and performing an image processing operation, which is not affected by adjustment of the image processing conditions performed by the verification, is performed regardless of whether or not the verification has been finished, wherein the image processing operation, which is not affected by the adjustment of the image processing conditions performed by the verification, relates to at least one of image compression processing, enlargement/reduction processing, sharpness emphasis processing, and image density dynamic range compression processing, and wherein the image processing operation, which is not affected by the adjustment of the image processing conditions performed by the verification, is frequency separation processing in the compression of an image to JPEG 2000 format.

2. The image processing method according to claim 1, wherein the image processing operation, which is not affected by the adjustment of the image processing conditions performed by the verification, relates to at least one of image compression processing, enlargement/reduction processing, sharpness emphasis processing, and image density dynamic range compression processing.

3. The image processing method according to claim 1, wherein the image processing operation, which is not affected by the adjustment of the image processing conditions performed by the verification, is the creation of thumb nail images for index print.

4. The image processing method according to claim 1, wherein the finished-state anticipating image is created using image data corresponding to the output image data.

5. An image processing method of subjecting image data having been supplied to image processing so as to arrange the image data as output image data, comprising the steps of:

performing a verification for adjusting image processing conditions when necessary referring to a finished-state anticipating image; and performing an image processing operation, which is not affected by adjustment of the image processing conditions performed by the verification, is performed regardless of whether or not the verification has been finished, wherein the image processing operation, which is not affected by the adjustment of the image processing conditions performed by the verification, relates to at least one of image compression processing, enlargement/reduction processing, sharpness emphasis processing, and image density dynamic range compression processing and wherein the image processing operation, which is not affected by the adjustment of the image processing conditions performed by the verification, is sharpness emphasis processing and the creation of frequency components in the image density dynamic range compression processing.

* * * * *